United States Patent [19]
Sakamoto et al.

[11] Patent Number: 6,121,298
[45] Date of Patent: Sep. 19, 2000

[54] ANTIBACTERIAL AND MILDEWPROOFING ORGANOPOLYSILOXANE COMPOSITION

[75] Inventors: Takafumi Sakamoto; Tokuo Sato, both of Matsuida-machi, Japan

[73] Assignee: Shin-Etsu Chemical Co., Ltd., Tokyo, Japan

[21] Appl. No.: 09/231,867

[22] Filed: Jan. 14, 1999

[30] Foreign Application Priority Data

Jan. 14, 1998 [JP] Japan ................................. 10-017968

[51] Int. Cl.$^7$ ................................. A01N 43/48
[52] U.S. Cl. ................. 514/359; 514/383; 523/122; 524/440; 524/442; 524/450; 524/588; 524/863; 524/106; 528/34
[58] Field of Search .................. 514/359, 383; 523/122; 524/106, 440, 442, 450, 588, 863; 528/34

[56] References Cited

U.S. PATENT DOCUMENTS 2,873,263  2/1959  Lal .
6,013,643  1/2000  Sakamoto et al. ................. 514/188

FOREIGN PATENT DOCUMENTS 0 640 661  3/1995  European Pat. Off. .

OTHER PUBLICATIONS

Chemical Abstracts, vol. 123, No. 18, Oct. 30, 1995, AN 231020, JP 07 076654, Mar. 20, 1995.
Chemical Abstracts, vol. 126, No. 16, Apr. 21, 1997, AN 212841, JP 09 025 410, Jan. 28, 1997.

*Primary Examiner*—Robert Dawson
*Assistant Examiner*—Jeffrey B. Robertson
*Attorney, Agent, or Firm*—Oblon, Spivak, McClelland, Maier, & Neustadt, P.C.

[57] ABSTRACT

An antibacterial and mildewproofing organopolysiloxane composition comprising (A) an organopolysiloxane such as polydimethylsiloxane terminated with silanol groups or polydimethylsiloxane terminated with trimethylsiloxyl groups, (B) a hydrolyzable silane compound and/or a partial hydrolysis-condensation product thereof, (C) a triazolyl-group-containing compound such as tebuconazole and (D) an inorganic antibacterial agent comprising an inorganic substance comprising zeolite, apatite and/or silica and supporting or containing silver and/or silver ions.

This composition is superior in antibacterial properties, mildew resistance and permanence of mildew resistance and also superior in weatherability such as heat resistance and ultraviolet light resistance, may cause less change in color, and is useful as a sealing medium.

5 Claims, No Drawings

ANTIBACTERIAL AND MILDEWPROOFING ORGANOPOLYSILOXANE COMPOSITION

BACKGROUND OF THE INVENTION

1. Field of the Invention

This invention relates to an organopolysiloxane composition which is superior in both antibacterial properties and mildew resistance and also superior in weatherability such as heat resistance and ultraviolet light resistance and may cause less change in color, used in sealing mediums and so forth.

2. Description of the Prior Art

Moisture-crosslinkable, room temperature vulcanizing (RTV) silicone rubber compositions are utilized in various fields such as sealing mediums used for construction materials and adhesives used in electric and electronic fields. In particular, deoxime (or oxime-elimination) type RTV silicone rubber compositions are put into wide use because of their good adhesion to various adherends at wet places where water is used, e.g., kitchens and bathrooms in houses and also because of their superior weatherability.

Meanwhile, an improvement of construction techniques for housing in recent years has brought about an improvement in airtightness, and the wet places where water is used in houses provide suitable habitats for microorganisms such as fungi. In particular, fungi insert their hyphae up to the interior of RTV silicone rubber, and hence it is difficult not only to wipe off them but also remove them by chemicals, often resulting in damage of visual appearance.

As a measure for solving such a problem, it is common to add mildewproofing agents mixedly into sealing mediums. Especially in the case of silicone sealing mediums, proposed as mildewproofing agents from the viewpoint of mildew resistance and safety are 2,3,5,6-tetrachloro-4-methylsulfonylpyridine (Japanese Pre-examination Patent Publication (kokai) No. 51-106158), 2-(4-thiazolyl) benzimidazole (Japanese Pre-examination Patent Publication (kokai) No. 54-127960 and N-substituted benzimidazolyl carbamate derivatives such as methylbenzimidazol-2-yl carbamate (Japanese Pre-examination Patent Publication (kokai) No. 56-38348). Silicone sealing mediums containing these mildewproofing agents, however, have a problem of yellowing caused by heating and ultraviolet rays. Hence, such mildewproofing agents have had to be added in a small amount limited to such an extent that the yellowing does not occur, so that no sufficient mildew resistance has been exhibited. In particular, deoxime type compositions making use of an unsaturated-group-containing hydrolyzable silane as a curing agent tend strongly to cause this yellowing. Accordingly, as an mildewproofing agent that can restrain the yellowing, the present inventors have proposed a triazolyl-group-containing compound, as disclosed in Japanese Pre-examination Patent Publications (kokai) No. 8-217977 and No. 9-25410.

Meanwhile, in recent years, because of the problem of toxication due to pathogenic *Escherichia coli* O-157 and the development and sale of antibacterial type commodities such as floorings, sanitary earthenware and so forth endowed with antibacterial properties, sealing mediums used therein have become required to be made antibacterial.

However, the above conventional sealing mediums aiming chiefly at mildewproofing do not take account of the antibacterial properties. Accordingly, the present inventors have proposed a sealing medium comprising an organic mildewproofing agent such as an N-substituted benzimidazole compound with which an inorganic antibacterial agent of a silver, tin or copper type is combined so as to be endowed with both antibacterial properties and mildew resistance, as disclosed in Japanese Pre-examination Patent Publication (kokai) No. 7-76654. This sealing medium has a sufficient mildew resistance and also satisfies the antibacterial properties to a certain extent, but has still been insufficient in view of the permanence of antibacterial properties and the restraint of yellowing.

SUMMARY OF THE INVENTION

An object of the present invention to provide an antibacterial and mildewproofing organopolysiloxane composition which solves the problems the prior art has had, is superior in all the antibacterial properties, mildew resistance and permanence of antibacterial properties and also superior in weatherability such as heat resistance and ultraviolet light resistance, may cause less change in color, and is useful especially as a sealing medium for wet places where water is used.

The present inventors have already proposed in Japanese Pre-examination Patent Publications (kokai) No. 8-217977 and No. 9-25410 that a triazolyl-group-containing compound is effective for preventing changes in color of deoxime type RTV silicone rubber compositions and besides, in Japanese Pre-examination Patent Publication (kokai) No. 9-25410 that it is effective for the hydrolyzable silane used as a curing agent not to have any unsaturated group. However, in view of what is demanded recently at a much higher level, these proposals can not be well satisfactory for mildew resistant properties and color change preventive properties. A silicone rubber composition compounded with zeolite having silver ions supported thereon and a silicone rubber composition compounded with a calcium type ceramic having silver ions supported thereon are also proposed, as disclosed in Japanese Pre-examination Patent Publications (kokai) No. 7-62242 and No. 7-113044, respectively, which, however, do not suggest at all their use in combination with the triazolyl-group-containing compound. The present inventors have discovered that the permanence of antibacterial properties and the prevention of change in color can be achieved very well when a triazolyl-group-containing compound type mildewproofing agent and an inorganic type antibacterial agent are used in combination, thus they have accomplished the present invention.

The present invention provides an antibacterial and mildewproofing organopolysiloxane composition less causative of change in color, comprising:

(A) 100 parts by weight of an organopolysiloxane selected from the group consisting of:
   a compound represented by the following general formula (1):

$$HO(SiR^1_2O)_nH \qquad (1)$$

wherein $R^1$'s are each independently a substituted or unsubstituted monovalent hydrocarbon group having 1 to 10 carbon atoms, and n is an integer of 10 or more; and
   a compound represented by the following general formula (2):

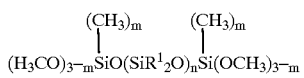

(2)

wherein $R^1$ and n are as defined above in the general formula (1), and m's are each independently 0 or 1;

(B) from 0.1 part by weight to 30 parts by weight of a compound selected from the group consisting of a silane compound having in the molecule 2 to 4 hydrolyzable groups bonded to a silicon atom and a partial hydrolysis-condensation product thereof;

(C) from 0.1 part by weight to 5 parts by weight of a triazolyl-group-containing compound represented by the following general formula (3):

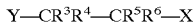

wherein $R^3$ and $R^4$ are each independently a hydrogen atom or a substituted or unsubstituted monovalent hydrocarbon group, $R^5$ and $R^6$ are each independently an alkoxyl group, a hydrogen atom or an alkyl group, Y is a hydroxyl group or a nitrile group, and X is a triazolyl group; and (D) from 0.05 part by weight to 5 parts by weight of an inorganic antibacterial agent.

In the above composition, the component (B) may preferably be a compound represented by the following general formula (4):

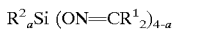

wherein $R^1$ is as defined above in the general formula (1), $R^2$ is an unsubstituted hydrocarbon group having 1 to 10 carbon atoms, and a is 0, 1 or 2.

The component (C) may preferably be a compound containing a 1,2,4-triazolyl-1-yl group. In particular, α-[2-(4-chlorophenyl)ethyl]-α-(1,1-dimethylethyl)-1H-1,2,4-triazol-1-ylethanol is preferred.

DESCRIPTION OF THE PREFERRED EMBODIMENTS (A) Organopolysiloxane

The component-(A) organopolysiloxane composition is a base polymer component in the composition of the present invention, and is represented by the above general formula (1) or (2).

In the general formula (1), $R^1$ are each independently a substituted or unsubstituted monovalent hydrocarbon group having 1 to 10 carbon atoms, which may include, e.g., alkyl groups such as a methyl group, an ethyl group and a propyl group, cycloalkyl groups such as a cyclohexyl group, alkenyl groups such as a vinyl group and an allyl group, aryl groups such as a phenyl group and a tolyl group, and any of these groups at least a part of hydrogen atoms of which has been substituted with a halogen atom or a cyano group, as exemplified by groups such as a 3,3,3-trifluoropropyl group and a 2-cyanoethyl group. Of these, a methyl group, a phenyl group and a 3,3,3-trifluoropropyl group are preferred. A methyl group is particularly preferred.

Letter symbol n is an integer of 10 or more, and this organopolysiloxane may preferably have a viscosity at 25° C. of from 25 to 500,000 cSt, and particularly from 1,000 to 100,000 cSt.

In the general formula (2), $R^1$ and n are as defined above in the general formula (1), and m's are each 0 or 1, and preferably 0.

The organopolysiloxanes represented by the general formulas (1) and (2) may each be used alone or in combination of two or more which have different viscosity and structure. Also, at least one organopolysiloxane represented by the general formula (1) and at least one organopolysiloxane represented by the general formula (2) may be used in combination.

(B) Silane Compound and/or Partial Hydrolysis-condensation Product

The component-(B) silane compound and/or a partial hydrolysis-condensation product thereof act(s) as a cross-linking agent in the composition of the present invention. This silane compound is one having in the molecule 2 to 4 hydrolyzable groups bonded to a silicon atom (hereinafter "hydrolyzable silane"), and is represented by the following general formula (5):

wherein $R^2$'s are each independently an unsubstituted hydrocarbon group having 1 to 10 carbon atoms, Z is a hydrolyzable group, and a is 0, 1 or 2, and preferably 0 or 1.

In the general formula (5), as examples of the group represented by $R^2$ may include unsubstituted hydrocarbon groups among the groups exemplified for the group represented by $R^1$ in the general formula (1). In particular, a methyl group, an ethyl group, a propyl group, a phenyl group and a vinyl group are preferred. The hydrolyzable group represented by Z may include, e.g., alkoxyl groups such as a methoxyl group and an ethoxyl group, enoxyl groups such as a propenoxyl group, acyloxyl groups such as an acetoxyl group, ketoxime groups such as a butanoxime group, amino groups, amide groups, aminoxyl groups, and alkenyloxyl groups.

In the present invention, among these hydrolyzable silanes, a ketoxime silane compound represented by the following general formula (4) may preferably be used because a particularly good effect of preventing yellowing can be obtained.

wherein $R^1$ is as defined above in the general formula (1), and $R^2$ and a are as defined above in the general formula (5). Examples of the groups represented by $R^1$ and $R^2$ are as described above.

As examples of the component-(B) hydrolyzable silane, it may include ketoximesilanes such as methyltris(dimethylketoxime)silane, methyltris(methylethylketoxime)silane, ethyltris(methylethylketoxime)silane, methyltris(methylisobutylketoxime)silane, vinyltris(methylethylketoxime)silane and vinylbutanoximesilane, and various silanes such as methyltrimethoxysilane, methyltriacetoxysilane, methyltriisopropenoxysilane, vinyltrimethoxysilane and vinyltriacetoxysilane. Any of these hydrolyzable silanes may be used alone or in combination of two or more.

The component-(B) hydrolyzable silane and/or its partial hydrolysis-condensation product may be used in an amount ranging from 0.1 to 30 parts by weight, and preferably from 1 to 15 parts by weight, based on 100 parts by weight of the component (A). Its use in an amount less than 0.1 part by weight may achieve no sufficient cross-linking, so that the composition can not have the intended rubber elasticity. On the other hand, its use in an amount more than 30 parts by weight, poor mechanical properties may result.

(C) Triazolyl-group-containing Compound

The component-(C) triazolyl-group-containing compound is one represented by the above general formula (3), and is an important component in the present invention as a component that imparts heat resistance, ultraviolet light resistance and mildew resistance to the composition of the present invention.

In the general formula (3), $R^3$ and $R^4$ are each independently a hydrogen atom or a substituted or unsubstituted monovalent hydrocarbon group. This monovalent hydrocarbon group may include those exemplified for the group represented by the general formula (1), and may preferably be an aliphatic saturated hydrocarbon group. Particularly preferred groups represented by $R^3$ and $R^4$ are a hydrogen atom, a 2-(4-chlorophenyl)ethyl group, a t-butyl group, a 4-chlorophenyl group, a dichlorophenyl group and a n-butyl group.

In the general formula (3), $R^5$ and $R^6$ are each independently an alkoxyl group, a hydrogen atom or an alkyl group. This alkyl group may include, e.g., a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group and a decyl group. The alkoxyl group may include, e.g., a methoxyl group, an ethoxyl group and a propoxyl group. A biphenylylalkoxyl in which any of these alkoxyl groups is bonded to a biphenylyl group is also included in the alkoxyl group referred to here. Particularly preferred groups represented by $R^5$ and $R^6$ are a hydrogen atom and a biphenylylalkoxyl group.

Y in the general formula (3) is a hydroxyl group or a nitrile group.

X in the general formula (3) is a triazolyl group. This triazolyl group may include, e.g., a 1,2,4-triazol-1-yl group represented by the general formula:

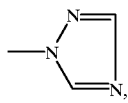

a 1,2,3-triazol-1-yl group represented by the general formula:

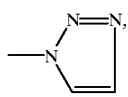

a 1,2,3-triazol-2-yl group represented by the general formula:

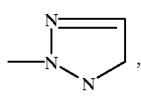

a 1,2,4-triazol-4-yl group represented by the general formula:

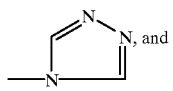

a 1,3,4-triazol-1-yl group represented by the general formula:

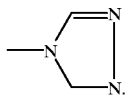

In particular, the 1,3,4-triazol-1-yl group is preferred.

As specific examples of the triazolyl-group-containing compound used in the present invention, it may include, e.g., tebuconazole: α-[2-(4-chlorophenyl)ethyl]-α-(1,1-dimethylethyl)-1H-1,2,4-triazol-1-ylethanol, represented by the formula:

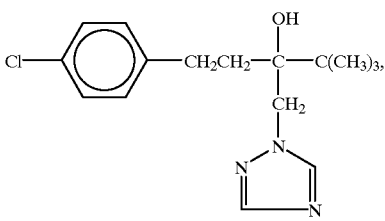

hexaconazole: (RS)-2-(2,4-dichlorophenyl)-1-(1H-1,2,4-triazol-1-yl)hexan-2-ol, represented by the formula:

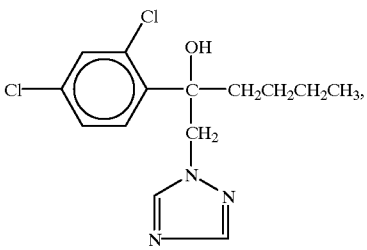

microbutanyl: 2-p-chlorophenyl-2-(1H-1,2,4-triazol-1-yl methyl)hexanenitrile, represented by the formula:

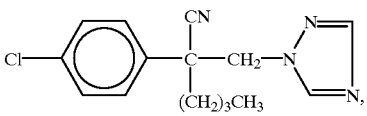

bitertanol: all-rac-1-(biphenyl-4-yloxy)-3,3-dimethyl-1-(1H-1,2,4-triazol-1-yl)butan-2-ol, represented by the formula:

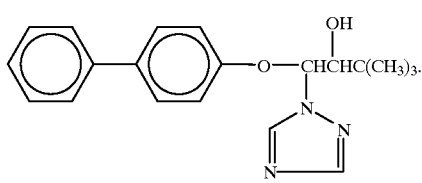

In particular, α-[2-(4-chlorophenyl)ethyl]-α-(1,1-dimethylethyl)-1H-1,2,4-triazol-1-ylethanol is preferred.

An of these triazolyl-group-containing compound may be used alone or in combination of two or more. It may be used in an amount of from 0.1 to 5 parts by weight, and preferably from 0.3 to 2 parts by weight, based on 100 parts by weight of the component (A). Its use in an amount less than 0.1 part by weight may make the resultant composition have insufficient heat resistance and ultraviolet light resistance. Its use in an amount more than 5 parts by weight can bring about almost no change in the effect of mildew resistance any longer and may rather bring about a possibility of damaging color-change resistance.

(D) Inorganic Antibacterial Agent

The component-(D) inorganic antibacterial agent is an important component that constitutes the present invention together with the component-(C) triazolyl-group-containing compound. There are no particular limitations on it so long as it is an inorganic antibacterial agent, as exemplified by inorganic antibacterial agents disclosed in Japanese Preexamination Patent Publications (kokai) No. 7-62242 and/or No. 7-113044. In particular, inorganic antibacterial agents supporting or containing at least one selected from the group consisting of silver and silver ions are preferred.

As the form in which the silver and/or silver ions is/are supported or contained, the silver and/or silver ions may be in the form of silver itself or a silver compound, in the state of silver ions or in the state where any of these are used in combination. These inorganic antibacterial agents can be obtained by a known process by subjecting inorganic substances such as zeolite, apatite and silica to ion exchange or adsorption of silver, followed by drying or by drying and sintering. The inorganic antibacterial agent may also contain a metal and/or metal irons other than the silver and/or silver ions, such as copper or zinc, and ammonium ions.

Any of these inorganic antibacterial agents may be used alone or in combination of two or more.

The silver and/or silver ions may be supported in an amount of from 0.0001 to 15% by weight, and particularly from 0.1 to 5% by weight, in terms of silver atoms.

The component-(D) inorganic antibacterial agent may be used in an amount ranging from 0.05 to 5 parts by weight, and preferably from 0.1 to 2.0 parts by weight, based on 100 parts by weight of the component-(A). Its use in an amount less than 0.05 part by weight may result in an insufficient antibacterial effect. Its use in an amount more than 2 parts by weight can bring about almost no change in the effect any longer and may rather bring about a possibility of damaging color-change resistance.

Other Components

In the composition of the present invention, additives such as a filler, a thixotropy improving agent and an adhesion auxiliary and a curing catalyst may be compounded in addition to the components (A) to (D) described above.

Filler:

The filler may include, e.g., fumed silica, and fumed silica whose particle surfaces have been subjected to hydrophobic treatment with a hydrophobic treating agent such as chlorosilane; pulverized silica, colloidal calcium carbonate, and any of these whose particles have been subjected to surface treatment with a fatty acid soap, rosin or a rosin ester; wet-process silica, heavy calcium carbonate, diatomaceous earth, iron oxide, titanium oxide, zinc oxide, magnesium carbonate, zinc carbonate, metal carbonates, carbon black, and fine-powder mica. The filler may be used alone or in combination of two or more.

The filler may usually be used in an amount of from about 5 to 300 parts by weight based on 100 parts by weight of the component (A).

Curing catalyst:

The curing catalyst may include, e.g., tin carboxylates such as tin octenoate, tin naphthenate, stannous caprylate and tin oleate; tin compounds such as dibutyltin diacetate, dibutyltin dioctoate, dibutyltin dilaurate, dibutyltin dioleate, diphenyltin diacetate, dibutyltin oxide, dibutyltin methoxide, dibutyl(bistriethoxysiloxy)tin and dibutyltin benzylmaleate; metal alkoxides such as tetraethyltitanate, tetrapropyltitanate, tetrabutyltitanate and tetraethoxyzirconate; organic metal compounds such as iron octenoate, iron naphthenate, lead naphthenate, zinc naphthenate, zinc stearate, zinc 2-ethylhexoate, zinc 2-ethyloctoate, iron 2-ethylhexoate, cobalt 2-ethylhexoate, manganese 2-ethylhexoate, cobalt naphthate and alkoxyalumium compounds; aminoalkyl-substituted alkoxysilanes such as 3-aminopropyltriethoxysilane and N-(trimethoxysilylpropyl)ethylenediamine; amine compounds such as hexylamine and phosphoric acid dodecyldodecylamine, and salts thereof; quaternary ammonium salts such as benzyltriethylammonium acetate; aklali metal lower fatty acid salts such as potassium acetate, sodium acetate and lithium oxalate; and dialkylhydroxylamines such as dimethylhydroxylamine and diethylhydroxylamine.

The curing catalyst may usually be used in an amount of from 0 to 5 parts by weight, and preferably from 0 to 1 part by weight, based on 100 parts by weight of the component (A).

Other additives:

Other additives may include, e.g., thixotropy improving agents such as polyether compounds, adhesion auxiliaries as exemplified by aminosilanes such as γ-aminopropyltriethoxysilane and epoxysilanes such as γ-glycidylpropyltriethoxysilane, colorants such as pigments and dyes, heat resistance improving agents such as red iron oxide, dehydrating agents, rust proofing agents, and silicone resin. Other mildewproofing agent and antibacterial agent may also be compounded so long as the cured products do not undergo yellowing.

In the present invention, a non-reactive silicone oil such as dimethylpolysiloxane terminated with triorganosilyl groups such as trimethylsilyl groups may preferably be added in an amount of 50 parts by weight or less, and particularly from 5 to 30 parts by weight, based on 100 parts by weight of the component (A).

EXAMPLES

The present invention will be further described below by giving Examples.

Example 1

To 90 parts by weight of polydimethylsiloxane having a viscosity at 25° C. of 20,000 cSt and terminated with silanol groups, 10 parts by weight of fumed silica whose particle surfaces were treated with dimethyldichlorosilane was added, and these were mixed by means of a mixer, followed by addition of 6 parts by weight of methytributanoximesilane and 0.1 part by weight of dibutyltin dioctate. These were mixed thoroughly under reduced pressure, and 1.0 part by weight of γ-aminopropyltriethoxysilane, 0.5 part by weight of α-[2-(4-chlorophenyl)ethyl]-α-(1,1-dimethylethyl)-1H-1,2,4-triazol-1-ylethanol (general name: tebuconazole) and 1.0 part by weight (in terms of silver atoms) of zeolite containing silver ions (an inorganic antibacterial agent available from Shinagawa Fuel Co., Ltd.; trade name: ZEOMIC) were further added, followed by thorough mixing under reduced pressure to obtain an antibacterial and mildewproofing organopolysiloxane composition.

Example 2

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 1.0 part by weight of tebuconazole and 1.0 part by weight of ZEOMIC (the same one as in Example 1) were further added, followed by thorough mixing under reduced pressure to obtain an antibacterial and mildewproofing organopolysiloxane composition.

Example 3

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 1.0 part by weight of tebuconazole and 5.0 part by weight of ZEOMIC (the same one as in Example 1) were further added, followed by thorough mixing under reduced pressure to obtain an antibacterial and mildewproofing organopolysiloxane composition.

Example 4

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 4 parts by weight of methyltriacetoxysilane and 0.1 part by weight of dibutyltin dioctate. These were mixed thoroughly under reduced pressure, and 1.0 part by weight of γ-aminopropyltriethoxysilane, 0.5 part by weight of tebuconazole and 1.0 part by weight of ZEOMIC (the same one as in Example 1) were further added, followed by thorough mixing under reduced pressure to obtain an antibacterial and mildewproofing organopolysiloxane composition.

Example 5

To 90 parts by weight of polydimethylsiloxane having a viscosity at 25° C. of 20,000 cSt and terminated with silanol groups, 10 parts by weight of polydimethylsiloxane having a viscosity at 25° C. 100 cSt and terminated with trimethylsiloxyl groups and 10 parts by weight of fumed silica whose particle surfaces were treated with dimethyldichlorosilane were added, and these were mixed by means of a mixer, followed by addition of 4 parts by weight of methyltrimethoxysilane and 1.0 part by weight of tetrabutoxytitanium. These were mixed thoroughly under reduced pressure, and 1.0 part by weight of γ-aminopropyltriethoxysilane, 0.5 part by weight of tebuconazole and 1.0 part by weight of ZEOMIC (the same one as in Example 1) were further added, followed by thorough mixing under reduced pressure to obtain an antibacterial and mildewproofing organopolysiloxane composition.

Comparative Example 1

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane and 0.05 part by weight of tebuconazole were further added, followed by thorough mixing under reduced pressure to obtain a mildewproofing organopolysiloxane composition.

Comparative Example 2

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane and 10.0 parts by weight of tebuconazole were further added, followed by thorough mixing under reduced pressure to obtain a mildewproofing organopolysiloxane composition.

Comparative Example 3

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane and 10.0 parts by weight of ZEOMIC (the same one as in Example 1) were further added, followed by thorough mixing under reduced pressure to obtain an antibacterial organopolysiloxane composition.

Comparative Example 4

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 10.0 parts by weight of tebuconazole and 10.0 part by weight of ZEOMIC (the same one as in Example 1) were further added, followed by thorough mixing under reduced pressure to obtain an antibacterial and mildewproofing organopolysiloxane composition.

Comparative Example 5

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 0.5 part by weight of methybenzimidazol-2-yl carbamate and 1.0 part by weight of ZEOMIC (the same one as in Example 1) were further added, followed by thorough mixing under reduced pressure to obtain an antibacterial and mildewproofing organopolysiloxane composition.

Constitutions of the compositions obtained in Examples 1 to 5 and Comparative Examples 1 to 5 above are summarized in Tables 1 and 2, respectively. In the tables, numerals are indicated as part(s) by weight.

Next, test samples were prepared from the respective compositions, and changes in color, antibacterial properties and mildew resistance were tested by the methods shown below. The results on the compositions of Examples and the compositions of Comparative Examples are shown in Tables 1 and 2, respectively.

Test Methods

Color-change test:

Each composition was molded into a 2 mm thick sheet, which was then left in an environment of 20 plus-minus 3° C. and 55 plus-minus 10%RH for a week to allow it to cure. On this sheet, the following color-change test was made.

1. Thermal color-change test:

On the sheet thus obtained by molding and curing, its initial color difference is measured with a color difference meter CR-300, manufactured by Minolta Camera Co., Ltd.), and is thereafter left in a 90° C. dryer for 200 hours to effect aging. On the aged sample, its color difference is measured to confirm the degree of yellowing (Δb) (the greater the value of Δb, the greater the change in color).

2. Ultraviolet light color-change test:

On the sheet thus obtained by molding and curing, its initial color difference is measured with a color difference meter CR-300, manufactured by Minolta Camera Co., Ltd.). Thereafter, it is exposed to ultraviolet light for 24 hours, emitted from a medical germicidal lamp so adjusted as to be 10 cm distant from the sample, to effect deterioration and aging. On the aged sample, its color difference is measured to confirm the degree of yellowing (Δb).

Mildewproofing performance test:

Using the same sample as used in the color-change test, its mildew resistance is measured according to JIS Z 2911, and is evaluated according to the following evaluation criteria. Mildew resistance is also measured after a sample is immersed in water at 50° C. for seven days and evaluated in the same manner.

Evaluation Criteria

Mildew resistance 1: The area where the hyphae of fungi inoculated in the sample or sample pieces in a given quantity have grown is more than ⅓ of the whole area.

Mildew resistance 2: The area where the hyphae of fungi inoculated in the sample or sample pieces in a given quantity have grown is not more than ⅓ of the whole area.

Mildew resistance 3: The hyphae of fungi inoculated in the sample or sample pieces in a given quantity are seen nowhere to have grown.

Antibacterial performance test:

Using the same sample as used in the color-change test, its antibacterial properties are measured according to JIS L 1902 (antibacterial properties test of textile goods), and is evaluated as (−) when the antibacterial effect is seen and as (+) when it is not seen.

TABLE 1

| Sample | | Example | | | | |
|---|---|---|---|---|---|---|
| | | 1 | 2 | 3 | 4 | 5 |
| Formulation | Silanolpolydimethylsiloxane (20,000 cSt) | 90 | 90 | 90 | 90 | |
| | Trimethoxysilylpolydimethylsiloxane (20,000 cst) | | | | | 90 |
| | Trimethylsiloxypolydimethylsiloxane (100 cst) | | 10 | 10 | 10 | 10 |
| | Fumed silica | 10 | 10 | 10 | 10 | 10 |
| | Methyltributanoximesilane | 6 | 4 | 4 | | |
| | Vinyltributanoximesilane | | 2 | 2 | | |
| | Methyltriaceoxysilane | | | | 4 | |
| | Methyltrimethoxysilane | | | | | 4 |
| | Dibutyltin dioctate | 0.1 | 0.1 | 0.1 | 0.1 | |
| | Tetrabutoxytitanium | | | | | 1.0 |
| | γ-Aminopropyltriethoxysilane | 1.0 | 1.0 | 1.0 | 1.0 | 1.0 |
| | Tebuconazole | 0.5 | 1.0 | 0.1 | 0.5 | 0.5 |
| | Methylbenzimidazol-2-yl carbamate | | | | | |
| | ZEOMIC | 1.0 | 1.0 | 5.0 | 1.0 | 1.0 |
| Color-change test: | Thermal color-change test | 2.3 | 2.5 | 1.9 | 2.2 | 2.5 |
| | Ultraviolet light color-change test | 2.5 | 2.6 | 3.6 | 2.1 | 2.6 |
| Mildew resistance test: | JIS Z 2911 | 3 | 3 | 3 | 3 | 3 |
| Mildew resistance test after immersion in water at 50° C. for 7 days: | JIS Z 2911 | 3 | 3 | 3 | 3 | 3 |
| Antibacterial test: | Staphylocossus aureus | − | − | − | − | − |
| | Escherichia coli | − | − | − | − | − |
| Antibacterial test after immersion in water at 50° C. for 7 days: | Staphylocossus aureus | − | − | − | − | − |
| | Escherichia coli | − | − | − | − | − |

TABLE 2

| | | Comparative Example | | | | |
|---|---|---|---|---|---|---|
| Sample | | 1 | 2 | 3 | 4 | 5 |
| Formulation: | Silanolpolydimethylsiloxane (20,000 cSt) | 90 | 90 | 90 | 90 | 90 |
| | Trimethylsiloxypolydimethylsiloxane (100 cSt) | 10 | 10 | 10 | 10 | 10 |
| | Fumed silica | 10 | 10 | 10 | 10 | 10 |
| | Methyltributanoximesilane | 4 | 4 | 4 | 4 | 4 |
| | Vinyltributanoximesilane | 2 | 2 | 2 | 2 | 2 |
| | Dibutyltin dioctate | 0.1 | 0.1 | 0.1 | 0.1 | 0.1 |
| | γ-Aminopropyltriethoxysilane | 1.0 | 1.0 | 1.0 | 1.0 | 1.0 |
| | Tebuconazole | 0.05 | 10.0 | | 10.0 | |
| | Methylbenzimidazol-2-yl carbamate | | | | | 0.5 |
| | ZEOMIC | | | 10.0 | 10.0 | 1.0 |
| Color-change test: | Thermal color-change test | 1.2 | 5.8 | 1.8 | 7.9 | 6.7 |
| | Ultraviolet light color-change test | 0.9 | 2.8 | 16.0 | 16.8 | 4.8 |
| Mildew resistance test: | JIS Z 2911 | 2 | 3 | 1 | 3 | 2 |
| Mildew resistance test after immersion in water at 50° C. for 7 days: | JIS Z 2911 | 1 | 3 | 1 | 3 | 1 |
| Antibacterial test: | *Staphylocossus aureus* | + | − | − | − | − |
| | *Escherichia coli* | + | + | − | − | − |
| Antibacterial test after immersion in water at 50° C. for 7 days: | *Staphylocossus aureus* | + | − | − | − | − |
| | *Escherichia coli* | + | + | − | − | − |

Example 6

To 90 parts by weight of polydimethylsiloxane having a viscosity at 25° C. of 20,000 cSt and terminated with methyldimethoxysilyl groups, 10 parts by weight of polydimethylsiloxane having a viscosity at 25° C. of 100 cSt and terminated with trimethylsilyl groups and 10 parts by weight of fumed silica whose particle surfaces were treated with dimethyldichlorosilane were added, and these were mixed by means of a mixer, followed by addition of 4 parts by weight of methyltrimethoxysilane and 1.0 part by weight of tetrabutoxytitanium. These were mixed thoroughly under reduced pressure, and 1.0 part by weight of γ-aminopropyltriethoxysilane, 0.5 part by weight of tebuconazole and 1.0 part by weight of ZEOMIC (the same one as in Example 1) were further added, followed by thorough mixing under reduced pressure to obtain an antibacterial and mildewproofing organopolysiloxane composition.

Comparative Example 6

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 10.0 parts by weight of tebuconazole and 1.0 part by weight of ZEOMIC (the same one as in Example 1) were further added, followed by thorough mixing under reduced pressure to obtain an antibacterial and mildewproofing organopolysiloxane composition.

Comparative Example 7

To 90 parts by weight of polydimethylsiloxane having a viscosity at 25° C. of 20,000 cSt and terminated with silanol groups, 10 parts by weight of polydimethylsiloxane having a viscosity at 25° C. of 100 cSt and terminated with trimethylsiloxyl groups and 10 parts by weight of fumed silica whose particle surfaces were treated with dimethyldichlorosilane were added, and these were mixed by means of a mixer, followed by addition of 2 parts by weight of vinyltributanoximesilane, 4 parts by weight of methyltributanoximesilane and 0.1 part by weight of dibutyltin dioctate. These were mixed thoroughly under reduced pressure, and 1.0 part by weight of γ-aminopropyltriethoxysilane, 0.5 part by weight of tebuconazole and 10.0 parts by weight of ZEOMIC (the same one as in Example 1) were further added, followed by thorough mixing under reduced pressure to obtain an antibacterial and mildewproofing organopolysiloxane composition.

Constitutions of the compositions obtained in Example 6 and Comparative Examples 6 and 7 above are summarized in Table 3. In the table, numerals are indicated as part(s) by weight.

Next, test samples were prepared from the respective compositions, and changes in color, antibacterial properties and mildew resistance were tested by the methods shown in Examples 1 to 5. The results on the compositions of Examples and Comparative Examples are shown in Table 3.

TABLE 3

| | | Example | Comparative Example | |
|---|---|---|---|---|
| Sample | | 6 | 6 | 7 |
| Formulation: | Silanolpolydimethylsiloxane (20,000 cSt) | | 90 | 90 |
| | Methyldimethoxysilylpolydimethylsiloxane (20,000 cSt) | 90 | | |
| | Trimethylsiloxypolydimethylsiloxane (100 cSt) | 10 | 10 | 10 |
| | Fumed silica | 10 | 10 | 10 |
| | Methyltributanoximesilane | | 4 | 4 |
| | Vinyltributanoximesilane | | 2 | 2 |
| | Methyltrimethoxysilane | 4 | | |
| | Dibutyltin dioctate | | 0.1 | 0.1 |
| | Tetrabutoxytitanium | 1.0 | | |
| | γ-Aminopropyltriethoxysilane | 1.0 | 1.0 | 1.0 |
| | Tebuconazole | 0.5 | 10.0 | 0.5 |
| | ZEOMIC | 1.0 | 1.0 | 10.0 |
| Color-change test: | Thermal color-change test | 2.4 | 6.3 | 2.2 |
| | Ultraviolet light color-change test | 2.5 | 5.1 | 16.3 |
| Mildew resistance test: | JIS Z 2911 | 3 | 3 | 3 |
| Antibacterial test: | *Staphylocossus aureus* | − | − | − |
| | *Escherichia coli* | − | − | − |

As described above, the organopolysiloxane composition of the present invention makes it possible to obtain a silicone rubber which is superior in the antibacterial properties, mildew resistance and permanence of antibacterial properties and also superior in weatherability such as heat resistance and ultraviolet light resistance, and may cause less change in color. This silicone rubber is useful especially in sealing mediums for wet places where water is used and sealing mediums for construction materials.

What is claimed is:

1. An antibacterial and mildewproofing organopolysiloxane composition, comprising:

(A) 100 parts by weight of an organopolysiloxane selected from the group consisting of:

a compound represented by the following general formula (1):

$$HO(SiR^1{}_2O)_nH \quad (1)$$

wherein $R^1$'s are each independently a substituted or unsubstituted monovalent hydrocarbon group having 1 to 10 carbon atoms, and n is an integer of 10 or more; and a compound represented by the following general formula (2):

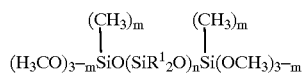

wherein $R^1$ and n are as defined above in the general formula (1), and m's are each independently 0 or 1;

(B) from 0.1 part by weight to 30 parts by weight of a compound selected from the group consisting of a silane compound having in the molecule 2 to 4 hydrolyzable groups bonded to a silicon atom and a partial hydrolysis-condensation product thereof;

(C) from 0.1 part by weight to 5 parts by weight of a triazolyl-group-containing compound represented by the following general formula (3):

$$Y-CR^3R^4-CR^5R^6-X \quad (3)$$

wherein $R^3$ and $R^4$ are each independently a hydrogen atom or a substituted or unsubstituted monovalent hydrocarbon group, $R^5$ and $R^6$ are each independently an alkoxyl group, a hydrogen atom or an alkyl group, Y is a hydroxyl group or a nitrile group, and X is a triazolyl group; and (D) from 0.05 part by weight to 5 parts by weight of an inorganic antibacterial agent.

2. The antibacterial and mildewproofing organopolysiloxane composition according to claim 1, wherein the component (B) is a compound represented by the following general formula (4):

$$R^2{}_aSi(ON=CR^1{}_2)_{4-a} \quad (4)$$

wherein $R^1$ is as defined above in the general formula (1), $R^2$ is an unsubstituted hydrocarbon group having 1 to 10 carbon atoms, and a is 0, 1 or 2.

3. The antibacterial and mildewproofing organopolysiloxane composition according to claim 1, wherein the component (C) is a compound containing a 1,2,4-triazolyl-1-yl group.

4. The antibacterial and mildewproofing organopolysiloxane composition according to claim 1, wherein the component (C) is α-[2-(4-chlorophenyl)ethyl]-α-(1,1-dimethylethyl)-1H-1,2,4-triazol-1-ylethanol.

5. The antibacterial and mildewproofing organopolysiloxane composition according to claim 1, wherein said inorganic antibacterial agent is an inorganic substance which supports or contains a member selected from the group consisting of silver and silver ions; said inorganic substance being a substance selected from the group consisting of zeolite, apatite and silica.

* * * * *